(12) United States Patent
Jiang et al.

(10) Patent No.: US 9,731,917 B2
(45) Date of Patent: Aug. 15, 2017

(54) VEHICLE GOODS BRACKET AND VEHICLE GOODS BRACKET SET

(75) Inventors: Hua Jiang, Shanghai (CN); Qi Zhou, Shanghai (CN); Yunfu Yan, Shanghai (CN); Haiwei Zhang, Shanghai (CN); Xian Guo, Shanghai (CN)

(73) Assignee: SHANGHAI ZHENHUA HEAVY INDUSTRIES CO., LTD., Shanghai (CN)

( * ) Notice: Subject to any disclaimer, the term of this patent is extended or adjusted under 35 U.S.C. 154(b) by 740 days.

(21) Appl. No.: 14/116,416

(22) PCT Filed: Dec. 2, 2011

(86) PCT No.: PCT/CN2011/083349
§ 371 (c)(1),
(2), (4) Date: Aug. 13, 2014

(87) PCT Pub. No.: WO2012/167581
PCT Pub. Date: Dec. 13, 2012

(65) Prior Publication Data
US 2014/0369796 A1    Dec. 18, 2014

(30) Foreign Application Priority Data

Jun. 7, 2011    (CN) .......................... 2011 1 0151753

(51) Int. Cl.
*B65G 67/04*    (2006.01)
*B65G 63/06*    (2006.01)
*B65G 67/24*    (2006.01)

(52) U.S. Cl.
CPC ........... *B65G 67/04* (2013.01); *B65G 63/065* (2013.01); *B65G 67/24* (2013.01)

(58) Field of Classification Search
CPC .................................. B65G 67/04; B65G 67/24
(Continued)

(56) References Cited

U.S. PATENT DOCUMENTS 2,069,236 A * 2/1937 Fitch .................... B65G 63/065
                                                                    104/32.1
3,028,024 A * 4/1962 Black .................... B60P 1/6427
                                                                    280/418.1
(Continued)

FOREIGN PATENT DOCUMENTS

CN    1764584 A    4/2006
CN    1876555 A    12/2006
(Continued)

OTHER PUBLICATIONS

International Search Report dated Feb. 12, 2012 in connection with PCT/CN2011/08349.

*Primary Examiner* — Jonathan Snelting
(74) *Attorney, Agent, or Firm* — Quarles & Brady LLP

(57) ABSTRACT

The present invention discloses a vehicle goods bracket which is provided at the side of a transport vehicle, and is capable of swinging outward and restoring inward, and which is capable of carrying goods up or down, so as to load and unload for the transport vehicle. The present invention also discloses a vehicle goods bracket set which includes a pair of vehicle goods brackets provided symmetrically at the two sides of the transport vehicle. The present invention further discloses a vehicle goods bracket group, comprising two sets of vehicle goods brackets which are adjacently arranged in the lengthwise direction of the transport vehicle, wherein each set of vehicle goods brackets comprises a pair of vehicle goods brackets provided symmetrically at the two sides of the transport vehicle. According to the length and quantity of goods, one set of vehicle goods brackets can work alone, or two sets of vehicle goods brackets work simultaneously, wherein the vehicle goods bracket group relates particularly to loading and unloading containers.

11 Claims, 5 Drawing Sheets

(58) Field of Classification Search
USPC .......................................................... 414/391
See application file for complete search history.

(56) References Cited

U.S. PATENT DOCUMENTS

| | | | | |
|---|---|---|---|---|
| 3,151,751 A * | 10/1964 | Marini | .................... | B61B 1/005 |
| | | | | 414/21 |
| 3,208,608 A * | 9/1965 | Tantlinger | ............. | B60P 1/6427 |
| | | | | 254/94 |
| 3,764,028 A * | 10/1973 | Blackburn | ........... | B65G 63/065 |
| | | | | 254/45 |
| 4,058,293 A * | 11/1977 | Kameda | .................... | B66F 7/22 |
| | | | | 254/89 H |
| 4,549,842 A | 10/1985 | Tidmarsh | | |
| 5,688,100 A * | 11/1997 | Wunder | ................ | B60P 1/6472 |
| | | | | 414/547 |
| 6,863,002 B2 * | 3/2005 | Vida | ..................... | B61D 47/00 |
| | | | | 105/404 |
| 2010/0213430 A1 * | 8/2010 | Franzen | ................ | B60P 1/6445 |
| | | | | 254/9 C |
| 2011/0116886 A1 * | 5/2011 | Franzen | .................... | B60P 7/13 |
| | | | | 410/70 |

FOREIGN PATENT DOCUMENTS

| | | | |
|---|---|---|---|
| DE | 19818760 A | 11/1999 | |
| EP | 1072539 A1 | 1/2001 | |
| WO | 02053441 A1 | 7/2002 | |

* cited by examiner

VEHICLE GOODS BRACKET AND VEHICLE GOODS BRACKET SET

CROSS-REFERENCE TO RELATED APPLICATIONS

This application represents the national stage entry of PCT International Application No. PCT/CN2011/083349 filed Dec. 2, 2011 and claims the benefit of Chinese Patent Application 201110151753.9 filed Jun. 7, 2011. The contents of both of these applications are hereby incorporated by reference as if set forth in their entirety herein.

FIELD OF THE INVENTION

The present invention relates to equipments for loading, unloading and transporting goods, and in particular to vehicle goods bracket and vehicle goods bracket set for loading, unloading and transporting containers.

BACKGROUND OF THE INVENTION

Traditionally, goods, especially containers, are loaded and unloaded directly by a crane grasping goods from ships, storage yard or the like and transferring them to transport vehicles, or on the contrary, grasping goods from transport vehicles and transferring them to ships, storage yard or the like. During the operation, the works between the crane and transport vehicles cannot be connected closely, and they have to wait for each other, which affects the loading and unloading efficiency.

Patent application No. US2010/0213430A1 discloses a transport vehicle, which is provided with a lifting platform on itself, with several fixed goods brackets being placed underneath a crane. The crane may place goods on the brackets temporarily and leave, and when convenient, the vehicle picks up the goods from the brackets by its lifting platform, such that it is unnecessary for the crane to wait for vehicles. On the contrary, vehicles may place temporarily goods on the brackets by the lifting platform and leave, and when convenient, the crane takes away the goods from the brackets such that it is unnecessary for the vehicles to wait for the crane. Although the solution of US2010/0213430A1 avoids the mutual wait between cranes and transport vehicles, the lifting platform provided on transport vehicle may cause that the transport vehicle is of remarkably increased weight and complicated structure, and increases the energy consumption. Besides, to achieve the objective, all existing vehicles have to be replaced, which would incur huge cost.

SUMMARY OF THE INVENTION

The objective of the present invention is to provide a bracket which is simple in structure, can load and unload goods on vehicles with high efficiency and low cost.

According to an embodiment of the present invention, a vehicle goods bracket is proposed, which is provided at the side of vehicle. The vehicle goods bracket can swing outward and restore inward, and carry goods up or down, so as to load and unload for transport vehicles.

In an embodiment, the vehicle goods bracket includes a stationary base, a stationary guide pillar, a slidable guide rod, a beam, a jack cylinder and a swing cylinder. The stationary base is fixed to a civil structure. The bottom of the stationary guide pillar is hinged to the stationary base. The slidable guide rod is slidably mounted in the stationary guide pillar. The beam is hinged to the top of the slidable guide rod. One end of the jack cylinder is hinged on the stationary guide pillar, and the other end is hinged on the bottom surface of the beam. One end of the swing cylinder is hinged on the stationary guide pillar, and the other end is hinged on the stationary base.

In an embodiment, the beam is hinged on the top of the slidable guide rod by a first pin. The bottom of the stationary guide pillar is hinged on the stationary base by a second pin. One end of the jack cylinder is hinged on the stationary guide pillar by a fourth pin, and the other end is hinged on the bottom surface of the beam by a third pin. One end of the swing cylinder is hinged on the stationary guide pillar by a fifth pin, and the other end is hinged on the stationary base by a sixth pin.

According to an embodiment of the present invention, a vehicle goods bracket set is proposed, which includes a pair of vehicle goods brackets provided symmetrically at the two sides of the transport vehicle, wherein each vehicle goods bracket can swing outward and restore inward, and carry goods up or down, so as to load and unload for the vehicle.

In an embodiment, each vehicle goods bracket includes a stationary base, a stationary guide pillar, a slidable guide rod, a beam, a jack cylinder and a swing cylinder. The stationary base is fixed to a civil structure. The bottom of the stationary guide pillar is hinged to the stationary base. The slidable guide rod is slidably mounted in the stationary guide pillar. The beam is hinged to the top of the slidable guide rod. One end of the jack cylinder is hinged on the stationary guide pillar, and the other end is hinged on the bottom surface of the beam. One end of the swing cylinder is hinged on the stationary guide pillar, and the other end is hinged on the stationary base.

In an embodiment, the beam is hinged on the top of the slidable guide rod by a first pin. The bottom of the stationary guide pillar is hinged on the stationary base by a second pin. One end of the jack cylinder is hinged on the stationary guide pillar by a fourth pin, and the other end is hinged on the bottom surface of the beam by a third pin. One end of the swing cylinder is hinged on the stationary guide pillar by a fifth pin, and the other end is hinged on the stationary base by a sixth pin.

In an embodiment, the swing cylinder contracts to swing the stationary guide pillar and the beam outward, such that the guide surface and the support plate of the beam becomes away from the guide frame of the transport vehicle. The swing cylinder expands to swing the stationary guide pillar and the beam inward, such that the beam arrives at the working position, wherein no intervening with the container occurs in the region of swing radius R between the support plate of the beam and the sixth pin.

In an embodiment, when the brackets assume the loading or unloading position, the guide surface and the support plate of the beam are positioned under the corner fittings of the container, away from the guide frame of the transport vehicle, wherein the inner distance a between the corner fittings of the container is greater than the width b of bearing beam of the transport vehicle.

In an embodiment, when the brackets assume the loading or unloading position and the container is to be unloaded, the jack cylinder expands and carrys up the slidable guide rod and the beam to cause the support plate of the beam to contact with the corner fittings of the container and to bear the weight thereof, and further to separate completely the container from the transport vehicle. When the brackets assume the loading or unloading position and the container is to be loaded, the jack cylinder contracts and carrys down the slidable guide rod and the beam to cause the bearing beam of the transport vehicle to contact with the bottom beam of the container and to bear the weight thereof, and further to separate completely the container from the support plate of the beam. The inner distance c between the jack cylinders is greater than the outside width d of the transport vehicle.

According to an embodiment of the present invention, a vehicle goods bracket group is proposed, which includes two sets of vehicle goods brackets which are adjacently arranged in the lengthwise direction of the transport vehicle, wherein each set of vehicle goods brackets includes a pair of vehicle goods brackets provided symmetrically at the two sides of the transport vehicle, each of which can swing outward and restore inward, and carry goods up or down, so as to load and unload for the vehicle. According to the length and quantity of goods loaded on the transport vehicle, one set of vehicle goods brackets works alone, or two sets of vehicle goods brackets work simultaneously.

The vehicle goods bracket group relates particularly to loading and unloading containers. For instance, if a transport vehicle transports double 20-foot containers, a single 40-foot container, or a single 45-foot container, two sets of brackets work at the same time, while if the transport vehicle transports a single 20-foot container, one set of brackets therein works alone.

In an embodiment, each vehicle goods bracket includes a stationary base, a stationary guide pillar, a slidable guide rod, a beam, a jack cylinder and a swing cylinder. The stationary base is fixed to a civil structure. The bottom of the stationary guide pillar is hinged to the stationary base. The slidable guide rod is slidably mounted in the stationary guide pillar. The beam is hinged to the top of the slidable guide rod. One end of the jack cylinder is hinged on the stationary guide pillar, and the other end is hinged on the bottom surface of the beam. One end of the swing cylinder is hinged on the stationary guide pillar, and the other end is hinged on the stationary base.

In an embodiment, the beam is hinged on the top of the slidable guide rod by a first pin. The bottom of the stationary guide pillar is hinged on the stationary base by a second pin. One end of the jack cylinder is hinged on the stationary guide pillar by a fourth pin, and the other end is hinged on the bottom surface of the beam by a third pin. One end of the swing cylinder is hinged on the stationary guide pillar by a fifth pin, and the other end is hinged on the stationary base by a sixth pin.

The present invention proposes a goods bracket with loading and unloading functions, which can unload regular goods, particularly containers, off a transport vehicle and can also load regular goods, particularly containers, onto a transport vehicle. If the goods brackets are placed underneath a crane and act as a transfer equipment, the mutual wait between the crane and the transport vehicle during transporting goods can be avoided. If the goods brackets are placed at a transport destination, for instance, an unloading area of a warehouse, when the vehicle arrives, goods thereon can be directly unloaded onto the brackets, and the vehicle can leave without unnecessary wait. This kind of brackets with loading and unloading functions have more wide applications, and low requirements on vehicles, even adaptable for all existing vehicles, such as infield container trucks, automatic guided vehicles (AGV) used for automated container terminals, and the like. The brackets also facilitate reconstruction based on existing facilities as well as energy conservation and emission reduction.

BRIEF DESCRIPTION OF THE DRAWINGS

The above-mentioned and other features, properties and advantages of the present invention will become more apparent through the description in conjunction with the accompanying drawings and embodiments. In the drawings, like reference numbers will be always used to refer to like features, in which.

DETAILED DESCRIPTION OF THE INVENTION

According to the design, it is needed to provide a vehicle goods bracket or a vehicle goods bracket set, which is adaptable for goods of different lengths or quantities. For instance, it has to be adaptable for loading and unloading a single 20-foot container, two 20-foot containers, a single 40-foot container or a single 45-foot container. Two brackets may be provided at opposite sides as a set, and there may be two sets of brackets arranged adjacently. The two sets of brackets may be arranged along the heading direction of the vehicle, and the pair of brackets in each set is disposed at the two sides of the vehicle. Each bracket has to include the following functions:

the whole bracket leaning outward (away from vehicle) and restoring: when a vehicle with goods is entering between the brackets, the brackets lean outward, so as to avoid intervening with projection parts on the vehicle like guide frames of containers. After the vehicle has been in, the brackets return to their normal positions for loading or unloading. Conversely, when the vehicle with goods is exiting from between the brackets, the brackets lean outward to prevent from intervening therewith. After the vehicle exits, the brackets return to the normal positions;

lifting: after a vehicle with goods enters between brackets and the brackets restore, the brackets rise and jack up the goods for unloading, in which the stroke thereof has to ensure that when the brackets rise to the upmost position, the unloaded vehicle can exit from between the pairs of brackets without intervening anything. On the contrary, if goods have been on the brackets, the brackets rise and jack up the goods to the upmost position, so as to give access to the vehicle. Then the brackets descend to place the goods onto the vehicle. Upon the vehicle with goods exits therefrom, the brackets lean outward to prevent from intervening.

According to the design above, the present invention firstly proposes a vehicle goods bracket, which is provided at the side of vehicle 101. The vehicle goods bracket can swing outward and restore inward, and carry goods up or down, so as to load and unload for the vehicle 101.

Figure 1:
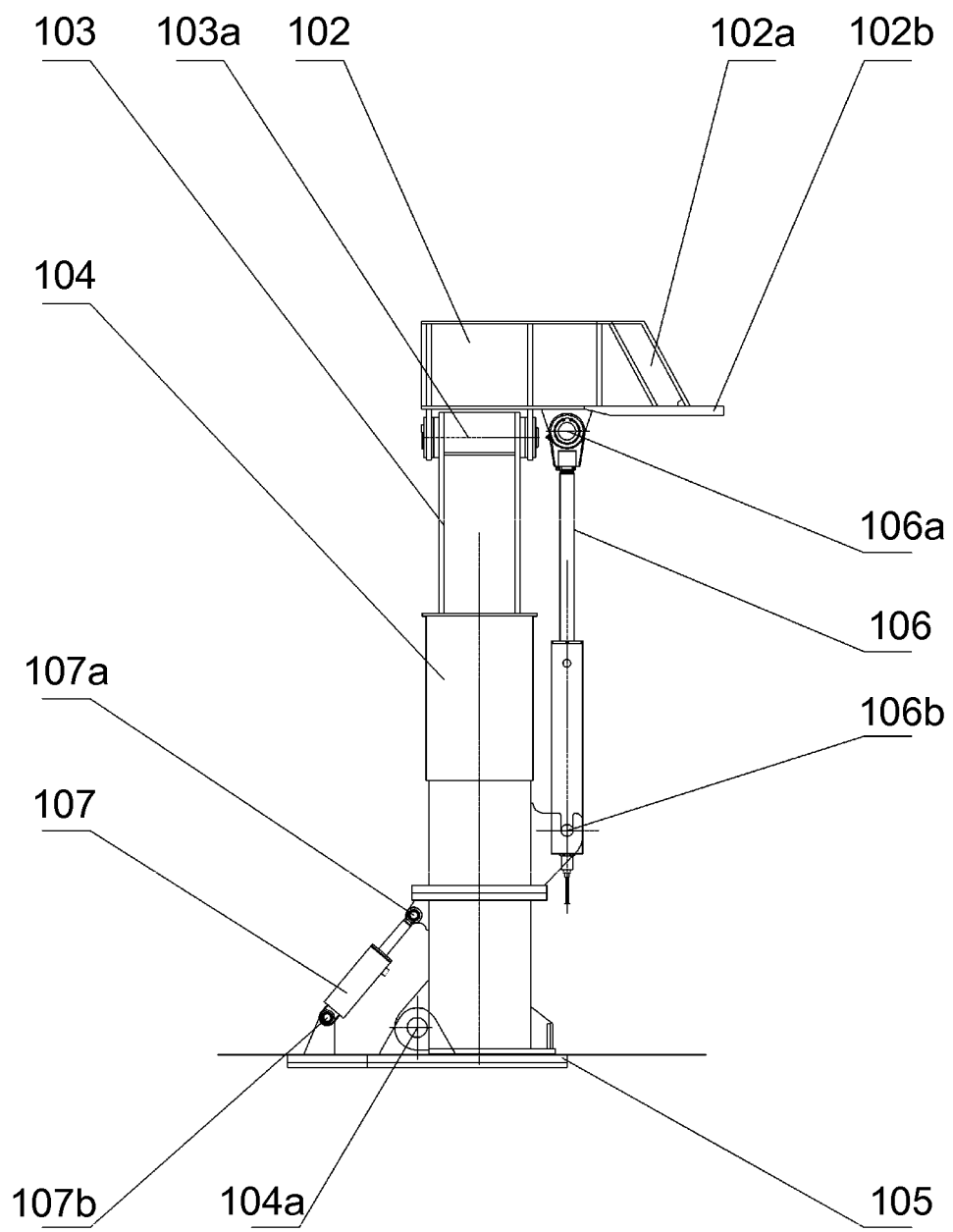
FIG. 1 illustrates the structural view of the vehicle goods bracket according to an embodiment of the present invention.

With reference to FIG. 1, it shows a structure of a single vehicle goods bracket according to an embodiment. The vehicle goods bracket includes a stationary base 105, a stationary guide pillar 104, a slidable guide rod 103, a beam 102, a jack cylinder 106 and a swing cylinder 107.

The stationary base 105 is fixed to a civil structure. The bottom of the stationary guide pillar 104 is hinged to the stationary base 105. The slidable guide rod 103 is slidably mounted in the stationary guide pillar 104. The beam 102 is hinged to the top of the slidable guide rod 103. One end of the jack cylinder 106 is hinged on the stationary guide pillar 104, and the other end is hinged on the bottom surface of the beam 102. One end of the swing cylinder 107 is hinged on the stationary guide pillar 104, and the other end is hinged on the stationary base 105. In the embodiment shown in FIG. 1, the beam 102 is hinged on the top of the slidable guide rod 103 by a first pin 103*a*. The bottom of the stationary guide pillar 104 is hinged on the stationary base 105 by a second pin 104*a*. One end of the jack cylinder 106 is hinged on the stationary guide pillar 104 by a fourth pin 106*b*, and the other end is hinged on the bottom surface of the beam 102 by a third pin 106*a*. One end of the swing cylinder 107 is hinged on the stationary guide pillar 104 by a fifth pin 107*a*, and the other end is hinged on the stationary base 105 by a sixth pin 107*b*.

To adapt to load and unload goods of different lengths and quantities, the present invention further proposes a vehicle goods bracketset. The vehicle goods bracket set is particularly suitable for loading and unloading containers, and is adaptable to different operation requirements on a single 20-foot container, two 20-foot containers, a single 40-foot container and a single 45-foot container. In an embodiment, the vehicle goods bracket set includes a pair of brackets provided symmetrically at the two sides of the transport vehicle 101, wherein each bracket can swing outward and restore inward, and carry goods up or down, so as to load and unload for the vehicle 101. In an embodiment, each vehicle goods bracket includes a stationary base 105, a stationary guide pillar 104, a slidable guide rod 103, a beam 102, a jack cylinder 106 and a swing cylinder 107.

The stationary base 105 is fixed to a civil structure. The bottom of the stationary guide pillar 104 is hinged to the stationary base 105. The slidable guide rod 103 is slidably mounted in the stationary guide pillar 104. The beam 102 is hinged to the top of the slidable guide rod 103. One end of the jack cylinder 106 is hinged on the stationary guide pillar 104, and the other end is hinged on the bottom surface of the beam 102. One end of the swing cylinder 107 is hinged on the stationary guide pillar 104, and the other end is hinged on the stationary base 105. In the embodiment shown in FIG. 1, the beam 102 is hinged on the top of the slidable guide rod 103 by a first pin 103*a*. The bottom of the stationary guide pillar 104 is hinged on the stationary base 105 by a second pin 104*a*. One end of the jack cylinder 106 is hinged on the stationary guide pillar 104 by a fourth pin 106*b*, and the other end is hinged on the bottom surface of the beam 102 by a third pin 106*a*. One end of the swing cylinder 107 is hinged on the stationary guide pillar 104 by a fifth pin 107*a*, and the other end is hinged on the stationary base 105 by a sixth pin 107*b*.

In another embodiment, the vehicle goods bracket group includes two sets of vehicle goods brackets which are adjacently arranged in the lengthwise direction of the transport vehicle 101, wherein each set of vehicle goods brackets includes a pair of brackets provided symmetrically at the two sides of the transport vehicle 101, each of which can swing outward and restore inward, and carry goods up or down, so as to load and unload for the vehicle 101. In an embodiment, each vehicle goods bracket includes a stationary base 105, a stationary guide pillar 104, a slidable guide rod 103, a beam 102, a jack cylinder 106 and a swing cylinder 107.

The stationary base 105 is fixed to a civil structure. The bottom of the stationary guide pillar 104 is hinged to the stationary base 105. The slidable guide rod 103 is slidably mounted in the stationary guide pillar 104. The beam 102 is hinged to the top of the slidable guide rod 103. One end of the jack cylinder 106 is hinged on the stationary guide pillar 104, and the other end is hinged on the bottom surface of the beam 102. One end of the swing cylinder 107 is hinged on the stationary guide pillar 104, and the other end is hinged on the stationary base 105. In the embodiment shown in FIG. 1, the beam 102 is hinged on the top of the slidable guide rod 103 by a first pin 103*a*. The bottom of the stationary guide pillar 104 is hinged on the stationary base 105 by a second pin 104*a*. One end of the jack cylinder 106 is hinged on the stationary guide pillar 104 by a fourth pin 106*b*, and the other end is hinged on the bottom surface of the beam 102 by a third pin 106*a*. One end of the swing cylinder 107 is hinged on the stationary guide pillar 104 by a fifth pin 107*a*, and the other end is hinged on the stationary base 105 by a sixth pin 107*b*.

Thus, according to the length and quantity of goods loaded on the transport vehicle, one set of brackets works alone, or the two sets of the brackets work simultaneously. For loading and unloading containers, if transport vehicle 101 transports double 20-foot containers, a single 40-foot container, or a single 45-foot container, two sets of brackets work at the same time, while if the transport vehicle 101 transports a single 20-foot container, one set of brackets works alone.

Figure 2:
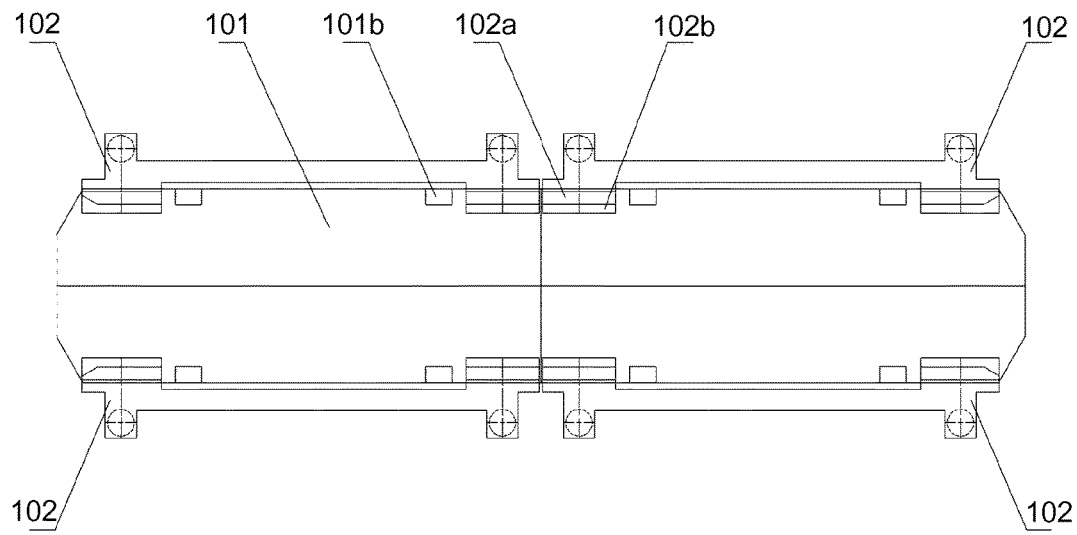
FIG. 2 is the top plan view of the arrangement of the vehicle goods bracket group relative to transport vehicles during working according to an embodiment of the present invention.

Referring to FIG. 2, it is a top view which illustrates the position relation between the two sets of (four) vehicle goods brackets and transport vehicle 101 when loading and unloading containers according to an embodiment of the present invention. The two sets of goods brackets (beam 102 can be seen in FIG. 2) are distributed respectively along the heading direction of the vehicle 101, and each pair of brackets (beam 102 can be seen in FIG. 2) are symmetrically disposed at the two sides of the vehicle 101.

Figure 3:
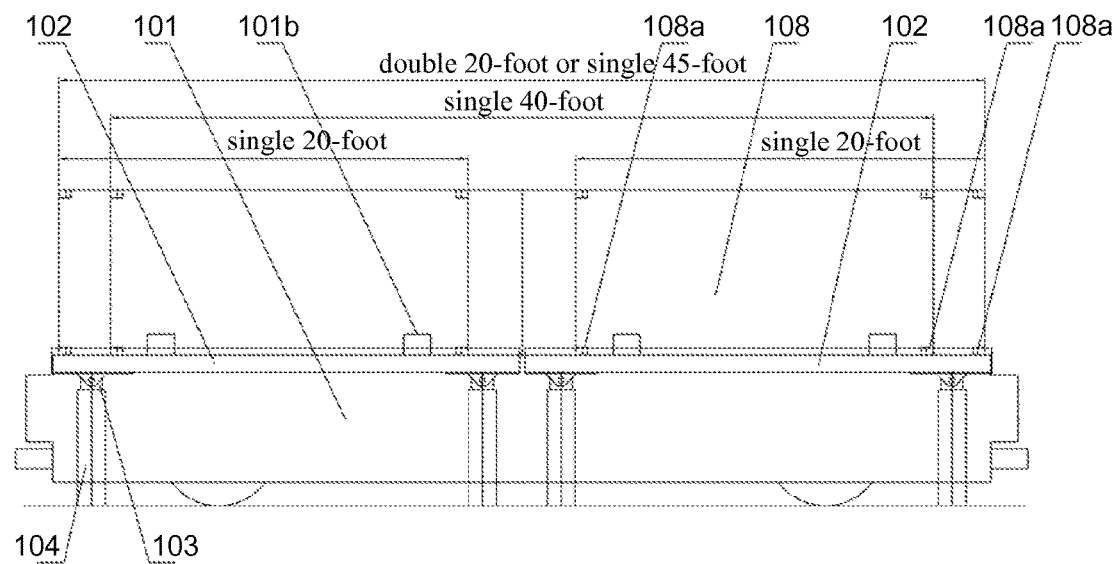
FIG. 3 is the side view of the arrangement of the vehicle goods bracket group relative to transport vehicles during working according to an embodiment of the present invention.

Referring to FIG. 3, it is a side view which illustrates the position relation between the two sets of (four) vehicle goods brackets and transport vehicle 101 when loading and unloading containers according to an embodiment of the present invention. If the containers 108 are double 20-foot containers, a single 40-foot container, or a single 45-foot container, two pairs of (four) brackets work at the same time, while if the container 108 is a single 20-foot container, depending on its position, one pair of (two) bracket works alone.

Figure 4:
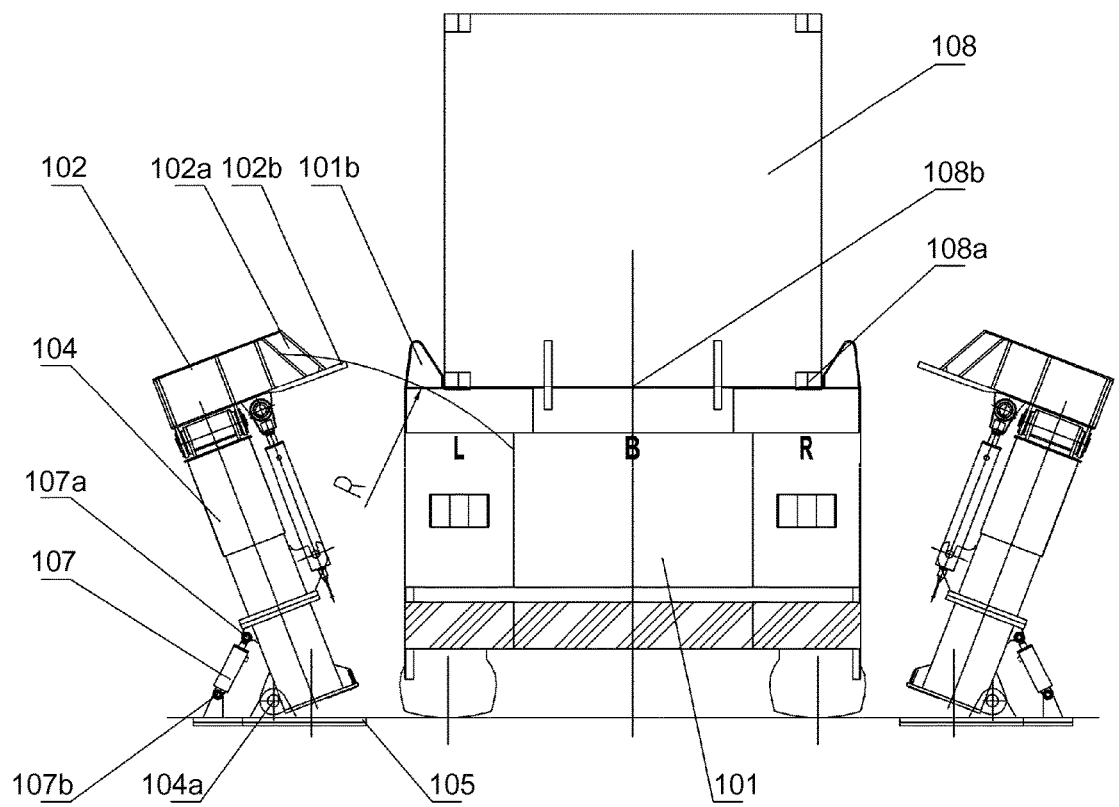
FIG. 4 is the schematic view of a situation that when a transport vehicle with containers enters or exits from between the brackets, the brackets swing outward to be away from the guide frame of the container on the transport vehicle according to an embodiment of the present invention.
Figure 5:
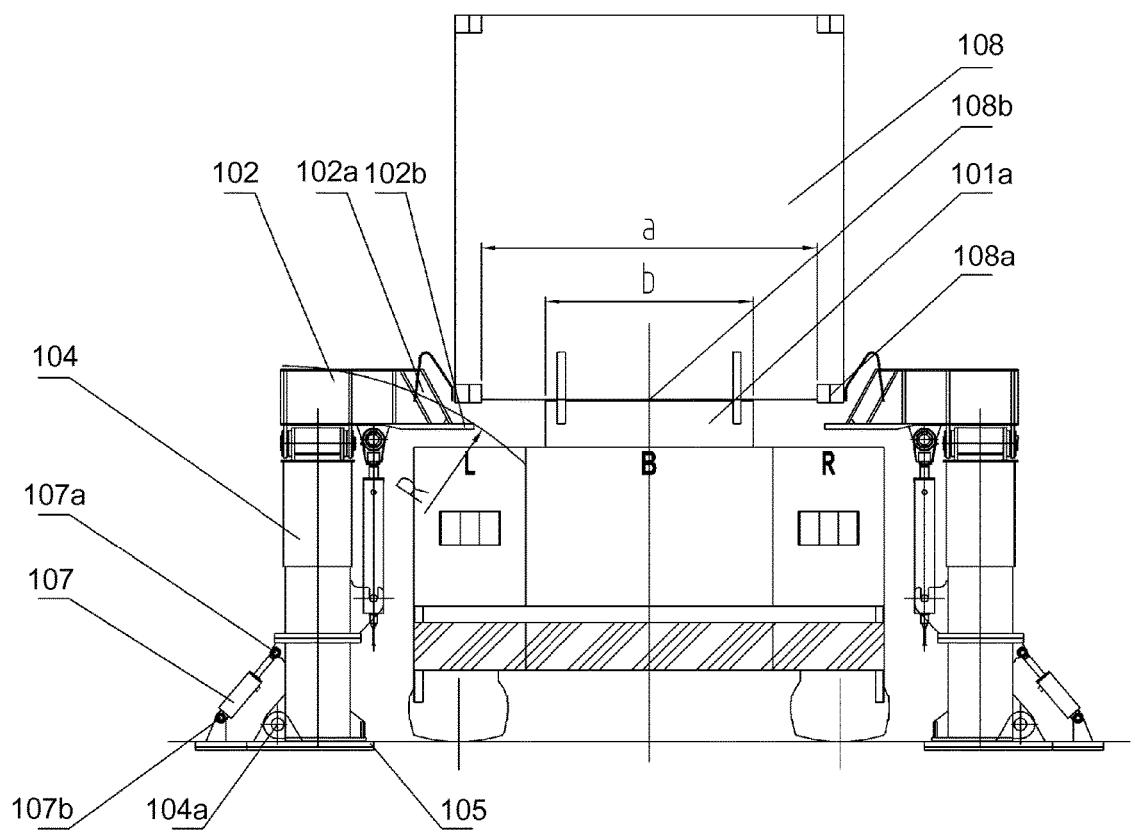
FIG. 5 is the schematic view of a loading or unloading operation of the vehicle goods brackets according to an embodiment of the present invention.

In an embodiment, the swing cylinder 107 contracts to swing the stationary guide pillar 104 and the beam 102 outward, such that the guide surface 102*a* and the support plate 102*b* of the beam 102 becomes away from the guide frame 101b of the transport vehicle 101. The swing cylinder 107 expands to swing the stationary guide pillar 104 and the beam 102 inward, such that the beam 102 arrives at the working position, during which no intervening with the container 108 occurs in the region of swing radius R between the support plate 102b of the beam 102 and the sixth pin 107b. As shown in FIG. 4, when the transport vehicle 101 with containers 108 enters or exits from between the brackets, the stationary guide pillar 104 and beam 102 can be swung outward (along the direction away from the transport vehicle 101) by the action of the swing cylinder 107, so as to make the guide surface 102a and support plate 102b of the beam 102 away from the guide frame 101b of the transport vehicle 101. As shown in FIG. 5, when the transport vehicle 101 arrives at the work position and stops, the stationary guide pillar 104 and the beam 102 can be swung inward (along the direction close to the transport vehicle 101) by the action of the swing cylinder 107, and return to their work positions. When the stationary guide pillar 104 and beam 102 is swinging, no intervening with the container 108 occurs in the region of swing radius R between the head of the support plate 102b of the beam 102 and the sixth 172b.

In an embodiment, when the brackets assume the loading or unloading position, the guide surface 102a and the support plate 102b of the beam 102 are positioned under the corner fittings 108a of the container 108, away from the guide frame 101b of the transport vehicle 101, wherein the inner distance a between the corner fittings 108a of the container 108 is greater than the width b of bearing beam 101a of the transport vehicle 101. Continuously referring to FIG. 5 and combining with FIG. 2 and FIG. 3, the guide surface 102a and the support plate 102b of the beam 102 are positioned under corner fittings 108a of the container 108, away from the guide frame 101b of the transport vehicle 101. As shown in FIG. 5, the inner distance a between the corner fittings 108a of the container 108 is greater than the width b of bearing beam 101a of the transport vehicle 101.

In an embodiment, when the brackets assume the loading or unloading position and the container is to be unloaded, the jack cylinder 106 expands and carrys up the slidable guide rod 103 and the beam 102 to cause the support plate 102b of the beam 102 to contact with the corner fittings 108a of the container 108 and to bear the weight thereof, and further to separate completely the container 108 from the transport vehicle 101. When the brackets assume the loading or unloading position and the container is to be loaded, the jack cylinder 106 contracts and carrys down the slidable guide rod 103 and the beam 102 to cause the bearing beam 101a of the transport vehicle 101 to contact with the bottom beam 108b of the container 108 and to bear the weight thereof, and further to separate completely the container 108 from the support plate 102b of the beam 102. The inner distance c between the jack cylinders 106 is greater than the outside width d of the transport vehicle 101.

Figure 6:
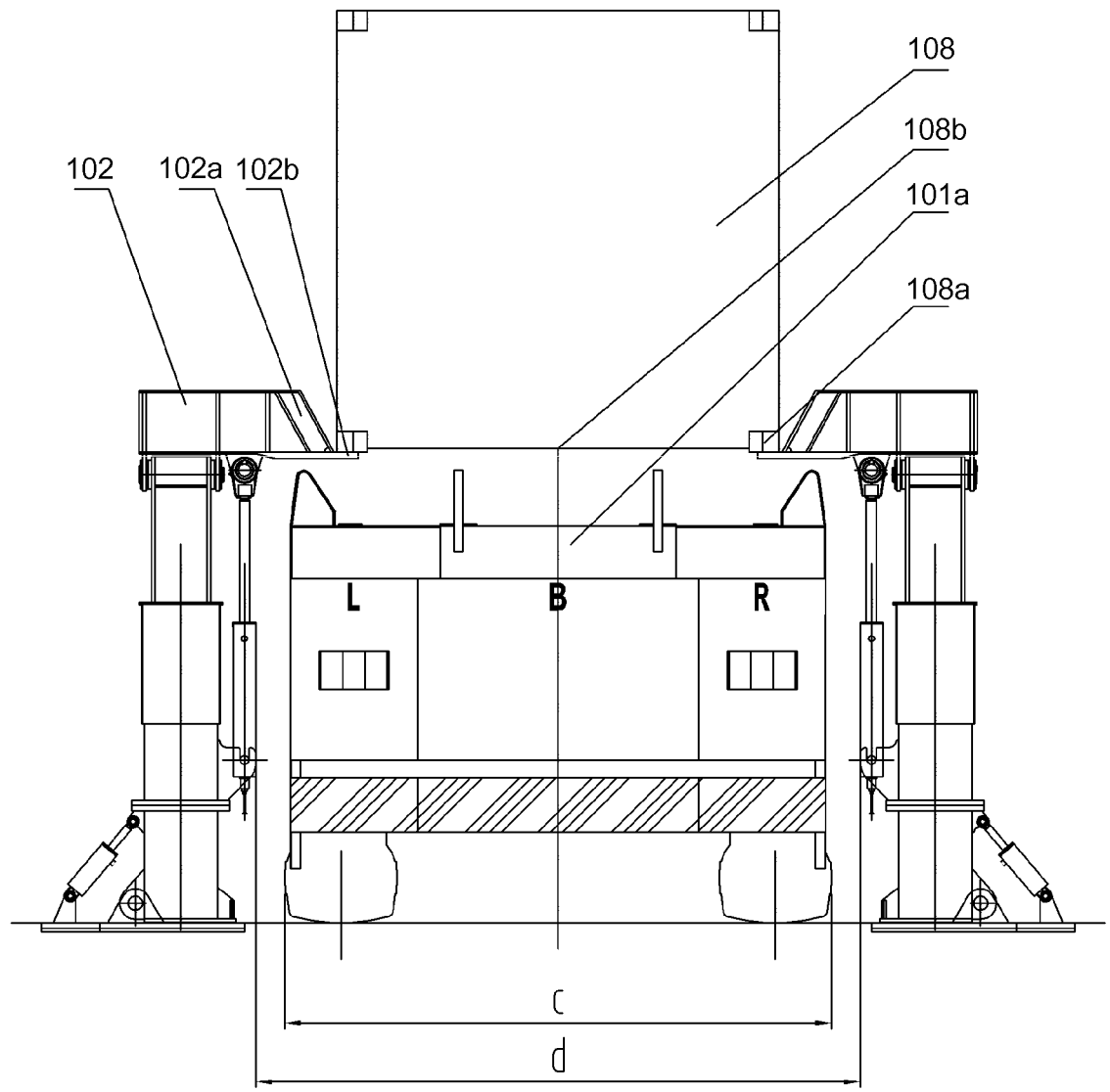
FIG. 6 is the schematic view of the vehicle goods brackets when a transport vehicle without containers enters or exits according to an embodiment of the present invention.

Referring to FIG. 6 and combining with FIG. 5, when the brackets assume the loading or unloading position and the container is to be unloaded, the slidable guide rod 103 and the beam 102 can be carried up by the jack cylinder 106 to cause the support plate 102b of the beam 102 to contact with the corner fittings 108a of the container 108 and to bear the weight thereof. At the same time, the container 108 is separated completely from the transport vehicle 101. Continuously referring to FIG. 6 and combining with FIG. 5, when the brackets assume the loading or unloading position and the container is to be loaded, the slidable guide rod 103 and the beam 102 is carried down by the jack cylinder 106 to cause the bearing beam 101a of the transport vehicle 101 to contact with the bottom beam 108b of the container 108 and to bear the weight thereof. At the same time, the container 108 is separated completely from the support plate 102b (for loading and unloading bracket) of the beam 102. As shown in FIG. 6, when the container 108 is on the loading and unloading bracket, i.e. when the jack cylinder 106 is expanding, the guide surface 102a and the support plate 102b of the beam 102 are positioned above the guide frame 101b of the transport vehicle 101, and at this time, the transport vehicle 101 can enter or exit from between the brackets. Continuously referring to FIG. 6, the inner distance c of the jack cylinder 106 should be greater than the outside width d of the transport vehicle 101.

In conjunction with the aforementioned description, and taking actual loading and unloading containers as an example:

the steps of unloading the container 108 from the transport vehicle 101 are as follows:

first, the vehicle goods brackets (or set) swinging outward to the position shown in FIG. 4;

second, the transport vehicle 101 with the container 108 entering between the vehicle goods brackets (or set), arriving at the position shown in FIG. 2 and FIG. 3 and stopping;

next, the vehicle goods brackets (or set) swinging inward to the position shown in FIG. 5;

then, the vehicle goods brackets (or set) carrying up the container 108 from the position shown in FIG. 5 to that shown in FIG. 6;

last, the transport vehicle 101 exiting inversely from between the vehicle goods brackets (or set).

The steps of loading the container 108 onto the transport vehicle 101 are as follows:

first, the vehicle goods brackets (or set) bearing the container 108, as shown in FIG. 6;

second, the transport vehicle 101 without load entering between the vehicle goods brackets (or set), arriving at the position shown in FIG. 2 and FIG. 3 and stopping;

next, the vehicle goods brackets (or set) carrying down the container 108 from the position shown in FIG. 6 to that shown in FIG. 5;

then, the vehicle goods brackets (or set) swinging outward to the position shown in FIG. 4;

subsequently, the transport vehicle 101 with container 108 exiting inversely from between the vehicle goods brackets (or set);

last, the vehicle goods brackets (or set) swinging inward to the position shown in FIG. 5.

The present invention proposes a goods bracket with loading and unloading functions, which can unload regular goods, particularly containers, off a transport vehicle and can also load regular goods, particularly containers, onto a transport vehicle. If the goods brackets are placed underneath a crane and act as a transfer equipment, the mutual wait between the crane and the transport vehicle during transporting goods can be avoided. If the goods brackets are placed at a transport destination, for instance, an unloading area of a warehouse, when the vehicle arrives, goods thereon can be directly unloaded onto the brackets, and the vehicle can leave without unnecessary wait. This kind of goods brackets with loading and unloading functions have more wide applications, and low requirements on vehicles, even adaptable for all existing vehicles, such as infield container trucks, automatic guided vehicles (AGV) used for automated container terminals, and the like. The goods brackets also facilitate reconstruction based on existing facilities as well as energy conservation and emission reduction.

The aforementioned embodiments are provided for the skilled in the art to accomplish or utilize the present invention, and the skilled in the art can make various modifications or alternations for the aforementioned embodiments without departing from the concepts of the present invention. Thus the protection scope of the present invention is not limited to the aforementioned embodiments, but the maximum scope in conformity with the innovative characteristics suggested in the appended claims.

The invention claimed is:

1. A vehicle goods bracket positionable adjacent a side of a transport vehicle, said vehicle goods bracket comprising:
   a stationary base:
   a guide pillar pivotably mounted to said stationary base about a pivot axis offset from and not intersecting with a longitudinal axis defined by said guide pillar, said guide pillar being pivotable about said pivot axis between an outward position away from the vehicle and an inward position toward the vehicle;
   a guide rod telescopically received in said guide pillar and slidable along the longitudinal axis defined by said guide pillar; and
   a support plate fixed to said guide rod and engagable with the vehicle when said guide pillar is in said inward position, so as to load and unload the transport vehicle.

2. The vehicle goods bracket according to claim 1, in which
   the stationary base is fixable to a vehicle;
   the guide pillar has a bottom that is pivotally mounted to the stationary base; and the vehicle goods bracket further includes
   a beam hinged to a top of the guide rod;
   a jack cylinder having one end hinged on the guide pillar, and another end hinged on a bottom surface of the beam; and
   a swing cylinder having one end hinged on the stationary guide pillar, and another end hinged on the stationary base.

3. The vehicle goods bracket according to claim 2, in which
   the beam is hinged on the top of the guide rod by a first pin;
   the bottom of the guide pillar is pivotally mounted to the stationary base by a second pin;
   the one end of the jack cylinder is hinged on the stationary guide pillar by a fourth pin, and the another end of the jack cylinder is hinged on the bottom surface of the beam by a third pin; and
   one end of the swing cylinder is hinged on the stationary guide pillar by a fifth pin, and the other end of the swing cylinder is hinged on the stationary base by a sixth pin.

4. A vehicle goods bracket set comprising:
   a pair of vehicle goods brackets according to claim 1 provided symmetrically at two sides of a transport vehicle having a container, wherein each vehicle goods bracket swings outward and restores inward, and carries goods up or down, so as to load the container in a loading position of the bracket and unload the container in an unloading position of the bracket for the vehicle.

5. The vehicle goods bracket set according to claim 4, in which
   the stationary base is fixable to a vehicle;
   the guide pillar has a bottom that is pivotally mounted to the stationary base; and the vehicle goods bracket further includes
   a beam hinged to a top of the guide rod;
   a jack cylinder having one end hinged on the stationary guide pillar, and another end hinged on a bottom surface of the beam; and
   a swing cylinder having one end hinged on the stationary guide pillar, and another end hinged on the stationary base.

6. The vehicle goods bracket set according to claim 5, in which
   the beam is hinged on the top of the guide rod by a first pin;
   the bottom of the guide pillar is pivotally mounted to the stationary base by a second pin;
   the one end of the jack cylinder is hinged on the stationary guide pillar by a fourth pin, and the another end of the jack cylinder is hinged on the bottom surface of the beam by a third pin; and
   one end of the swing cylinder is hinged on the stationary guide pillar by a fifth pin, and the other end of the swing cylinder is hinged on the stationary base by a sixth pin.

7. The vehicle goods bracket set according to claim 6, in which
   the swing cylinder contracts to swing the stationary guide pillar and the beam outward, such that a guide surface and a support plate of the beam becomes away from the guide frame of the transport vehicle;
   the swing cylinder expands to swing the stationary guide pillar and the beam inward, such that the beam arrives at the working position, wherein no intervening with the container occurs in a region of swing radius R between the support plate of the beam and the sixth pin.

8. The vehicle goods bracket set according to claim 5, in which
   when the brackets assume the loading or unloading position and the container is to be unloaded, the jack cylinder expands and carries up the guide rod and the beam to cause a support plate of the beam to contact with corner fittings of the container and to bear the weight of the corner fittings, and further to separate completely the container from the transport vehicle;
   when the brackets assume the loading or unloading position and the container is to be loaded, the jack cylinder contracts and carries down the guide rod and the beam to cause a bearing beam of the transport vehicle to contact with a bottom beam of the container and to bear the weight of the bottom beam, and further to separate completely the container from the support plate of the beam;
   wherein an inner distance c between the jack cylinders is greater than an outside width d of the transport vehicle.

9. A vehicle goods bracket group comprising:
   two sets of vehicle goods brackets according to claim 4 adjacently arranged in lengthwise direction of a transport vehicle, wherein each set of vehicle goods brackets comprises a pair of vehicle goods brackets provided symmetrically at two sides of the transport vehicle, each of which is capable of swinging outward and restoring inward, and carrying goods up or down, so as to load and unload the transport vehicle;
   wherein according to length and quantity of goods loaded on the transport vehicle, one set of vehicle goods brackets works alone, or two sets of vehicle goods brackets work simultaneously.

10. The vehicle goods bracket group according to claim 9, in which in each vehicle goods bracket:
    the stationary base is fixable to a vehicle;

the guide pillar has a bottom that is pivotally mounted to the stationary base; and the vehicle goods bracket further includes a beam hinged to a top of the guide rod;

a jack cylinder having one end hinged on the stationary guide pillar, and another end hinged on a bottom surface of the beam; and a swing cylinder having one end hinged on the stationary guide pillar, and another end hinged on the stationary base.

11. The vehicle goods bracket group according to claim 10, in which the beam is hinged on the top of the guide rod by a first pin;

the bottom of the guide pillar is hinged on the stationary base by a second pin;

the one end of the jack cylinder is hinged on the stationary guide pillar by a fourth pin, and the another end of the jack cylinder is hinged on the bottom surface of the beam by a third pin; and one end of the swing cylinder is hinged on the stationary guide pillar by a fifth pin, and the other end of the swing cylinder is hinged on the stationary base by a sixth pin.

* * * * *